(12) United States Patent
Lee

(10) Patent No.: US 10,248,236 B2
(45) Date of Patent: Apr. 2, 2019

(54) DISPLAY AND TOUCH PANELS WITH DRIVE AND SENSE TECHNIQUES

(71) Applicant: Yongman Lee, Seongnam-si (KR)

(72) Inventor: Yongman Lee, Seongnam-si (KR)

( * ) Notice: Subject to any disclaimer, the term of this patent is extended or adjusted under 35 U.S.C. 154(b) by 148 days.

(21) Appl. No.: 15/262,085

(22) Filed: Sep. 12, 2016

(65) Prior Publication Data

US 2017/0038875 A1    Feb. 9, 2017

Related U.S. Application Data

(62) Division of application No. 14/354,620, filed as application No. PCT/KR2012/008972 on Oct. 30, 2012, now Pat. No. 9,465,463.

(60) Provisional application No. 61/553,234, filed on Oct. 30, 2011.

(51) Int. Cl.
*G06F 3/041* (2006.01)
*G09G 3/36* (2006.01)
*G09G 3/3208* (2016.01)

(52) U.S. Cl.
CPC ............ *G06F 3/0412* (2013.01); *G06F 3/041* (2013.01); *G06F 3/0416* (2013.01); *G09G 3/3208* (2013.01); *G09G 3/3648* (2013.01); *G09G 3/3696* (2013.01); *G09G 2320/029* (2013.01); *G09G 2320/0285* (2013.01); *G09G 2320/045* (2013.01)

(58) Field of Classification Search
CPC .............. G09G 3/3648; G09G 3/3208; G09G 2320/0285; G09G 2320/029; G06F 3/0412; G06F 3/041; G06F 3/0416
See application file for complete search history.

(56) References Cited

U.S. PATENT DOCUMENTS

| 2007/0229415 | A1 | 10/2007 | Kasai |
| 2008/0018581 | A1* | 1/2008 | Park ................... G06F 3/0412 345/98 |
| 2008/0100562 | A1* | 5/2008 | Huang ............... G02F 1/13362 345/102 |
| 2009/0079464 | A1* | 3/2009 | Yoshii ............... G02F 1/136204 324/760.01 |
| 2009/0160740 | A1 | 6/2009 | Leon |
| 2009/0201282 | A1 | 8/2009 | Govil |
| 2010/0060600 | A1* | 3/2010 | Wang ................. G02F 1/13338 345/173 |

(Continued)

FOREIGN PATENT DOCUMENTS

| JP | 2010-281874 | 12/2010 |
| KR | 10-2011-0066506 | 6/2011 |

OTHER PUBLICATIONS

The Office Action, Korean Intellectual Property Office, Korean Patent Application No. 10-2014-7014597, dated Jul. 21, 2015.

*Primary Examiner* — Sahlu Okebato
(74) *Attorney, Agent, or Firm* — Lex IP Meister, PLLC

(57) ABSTRACT

The present invention provides a display device comprising: a display panel including a data line, a gate line, and a pixel; a data driver configured to output a data signal to the data line; a gate driver configured to output a gate signal to the gate line; and a signal controller configured to control the data driver, and the gate driver, wherein at least one of the data driver and the gate driver comprises a first current monitoring unit configured to monitor output current of the at least one of the data driver and the gate driver.

15 Claims, 21 Drawing Sheets

(56) References Cited

U.S. PATENT DOCUMENTS

| | | | |
|---|---|---|---|
| 2010/0245343 A1 | 9/2010 | Takei | |
| 2010/0253706 A1* | 10/2010 | Shirouzu | G09G 3/2092 345/690 |
| 2010/0277400 A1 | 11/2010 | Jeong | |
| 2011/0096064 A1* | 4/2011 | Sun | G09G 3/3648 345/212 |
| 2012/0105752 A1* | 5/2012 | Park | G02F 1/13338 349/33 |
| 2012/0162134 A1* | 6/2012 | Chen | G06F 3/044 345/174 |

* cited by examiner

[FIG. 1]
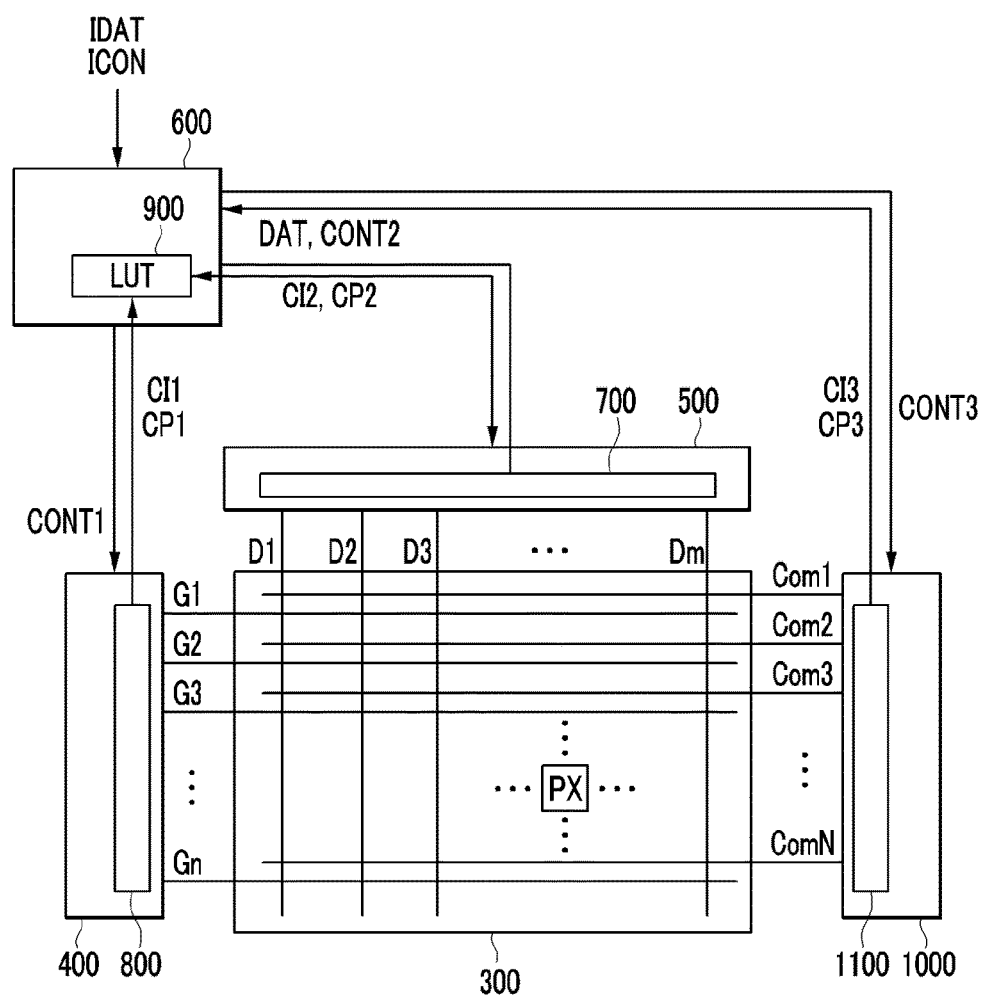

【FIG. 2】
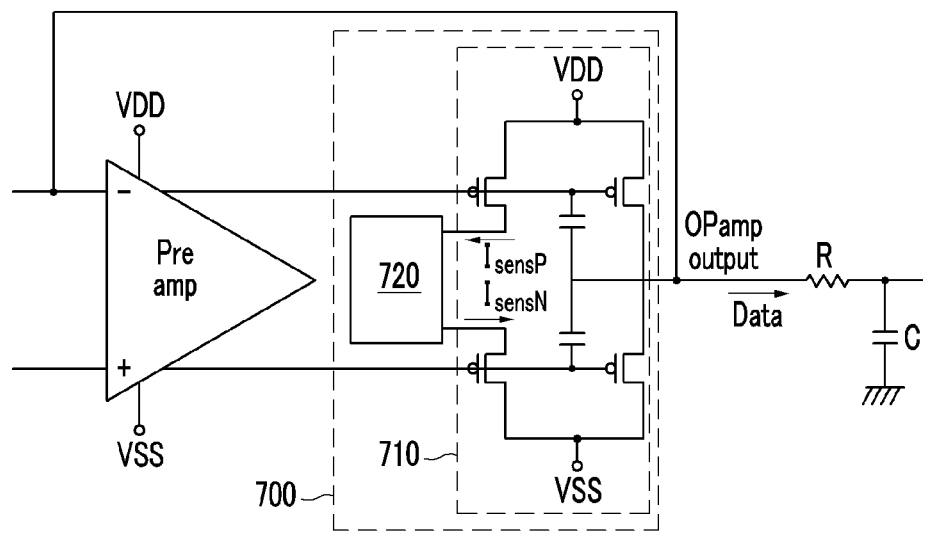
【FIG. 3】
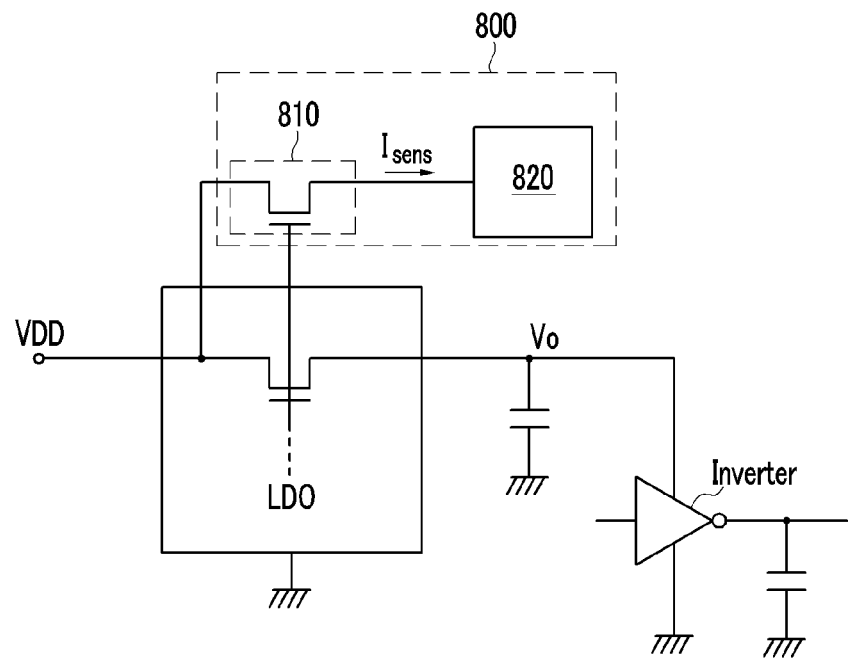

[FIG. 4]
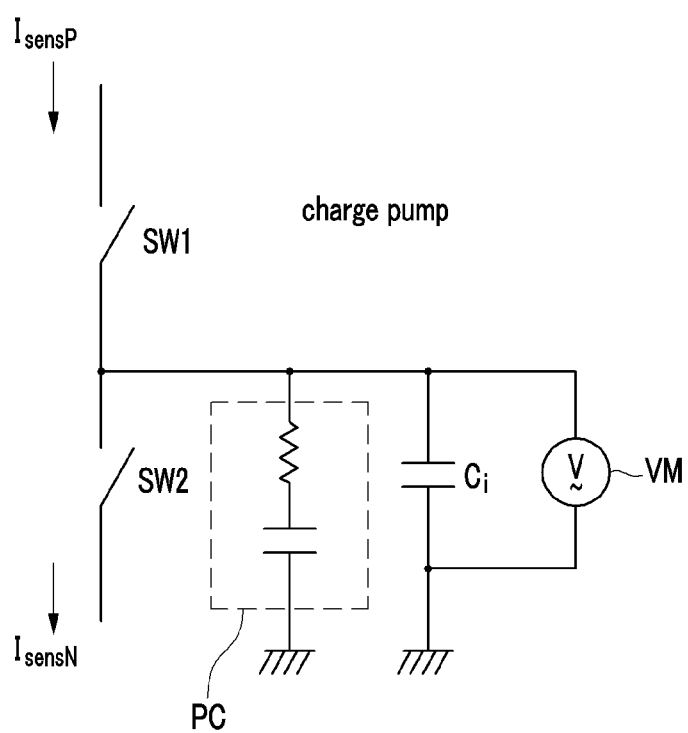

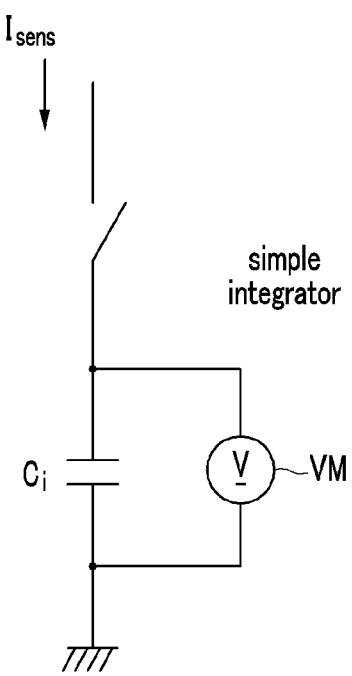

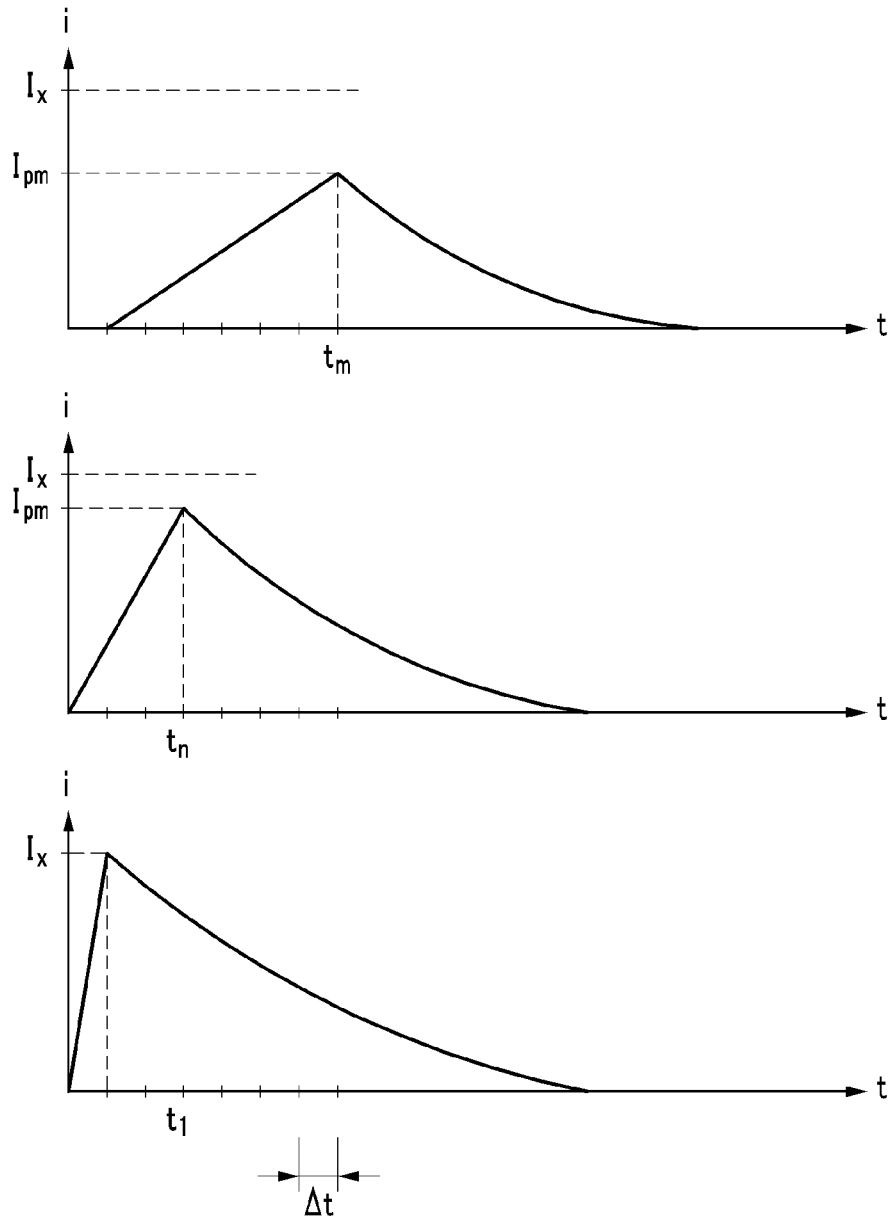
[FIG. 6]

[FIG. 7]
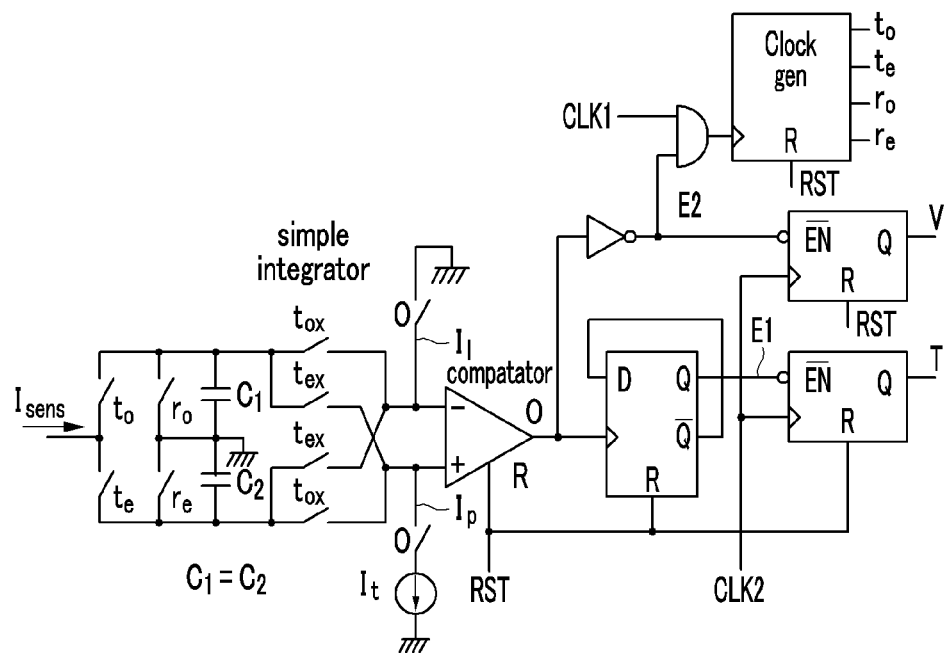

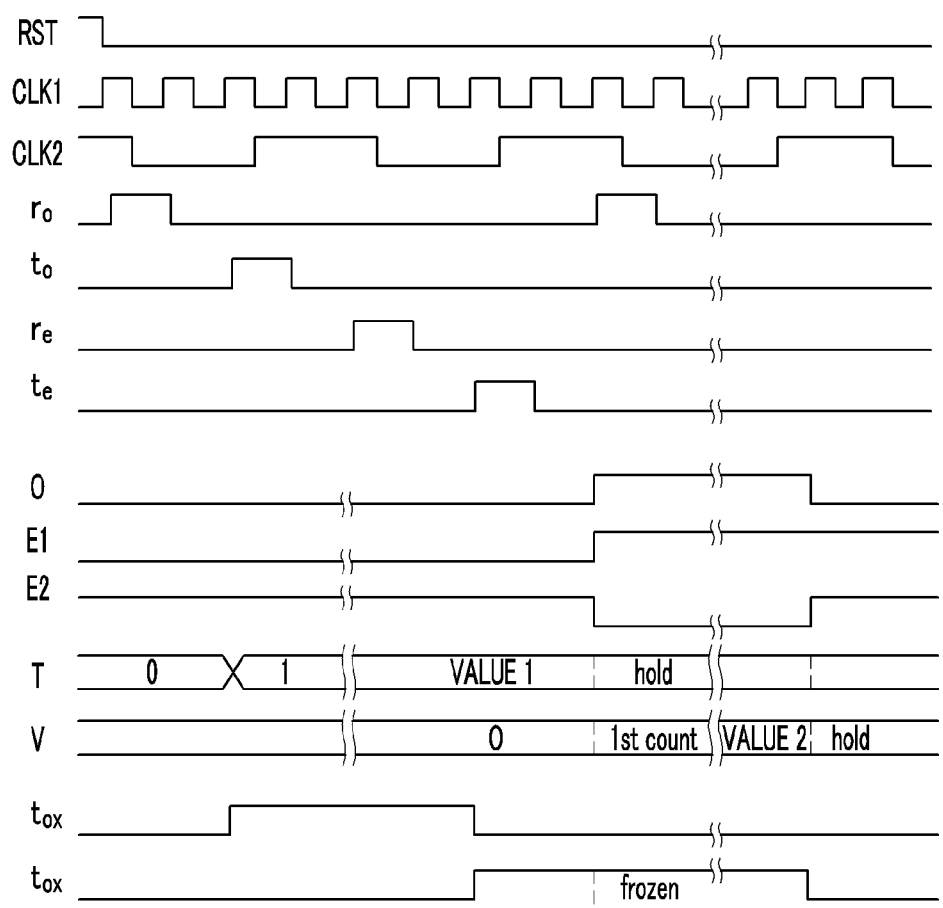

[FIG. 9]
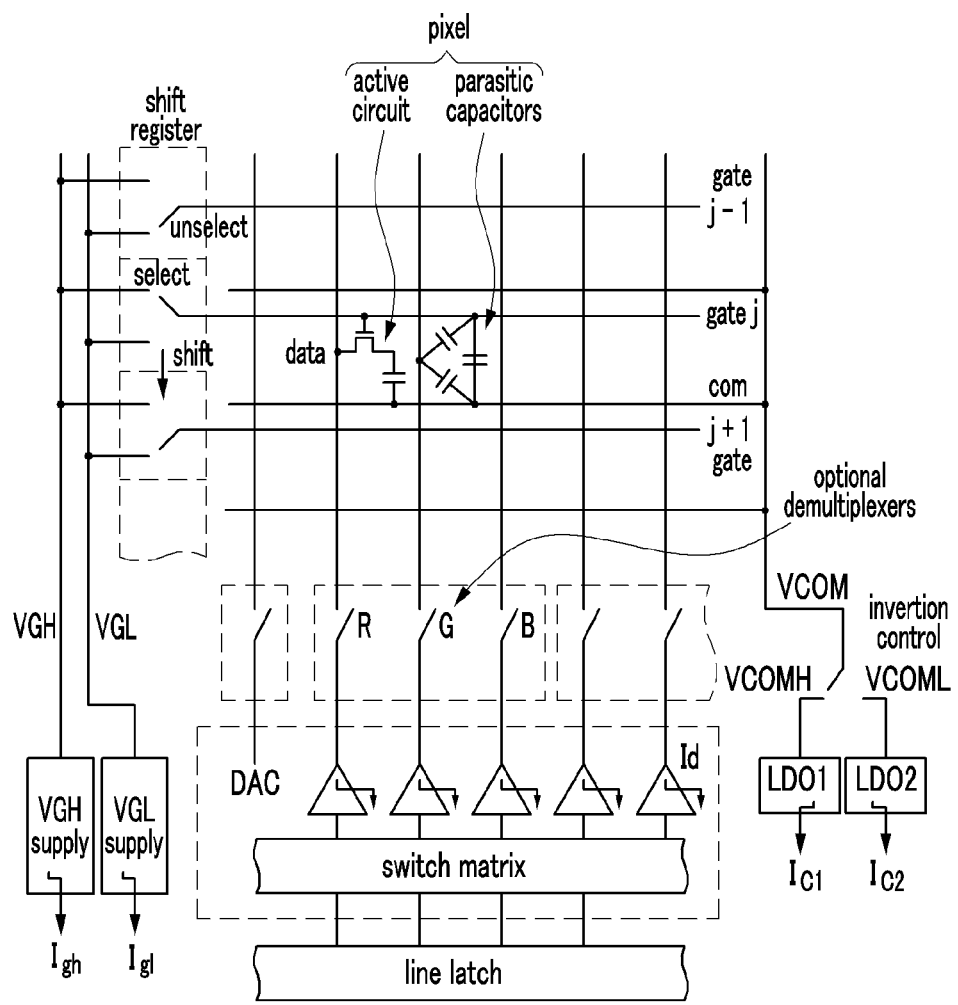

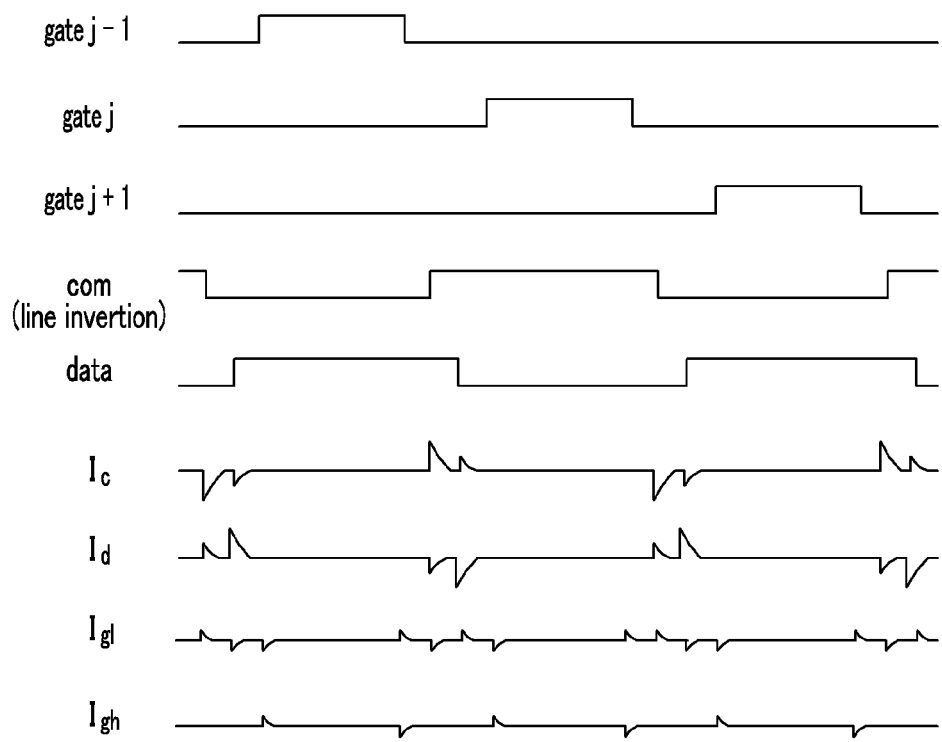

[FIG. 11]
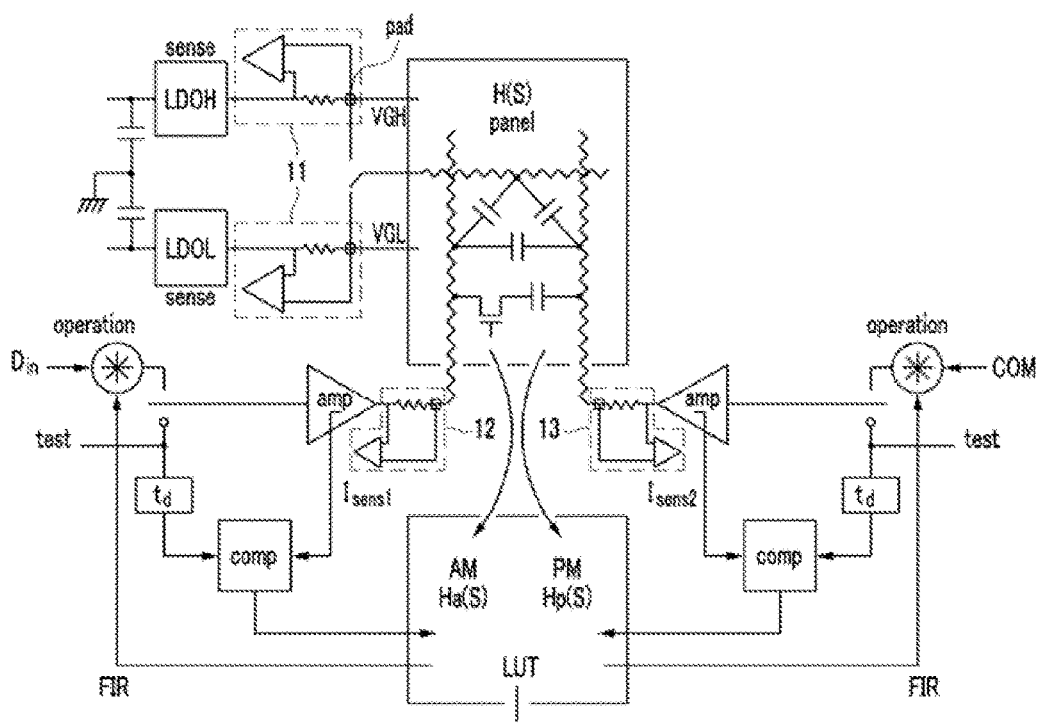

[FIG. 12]
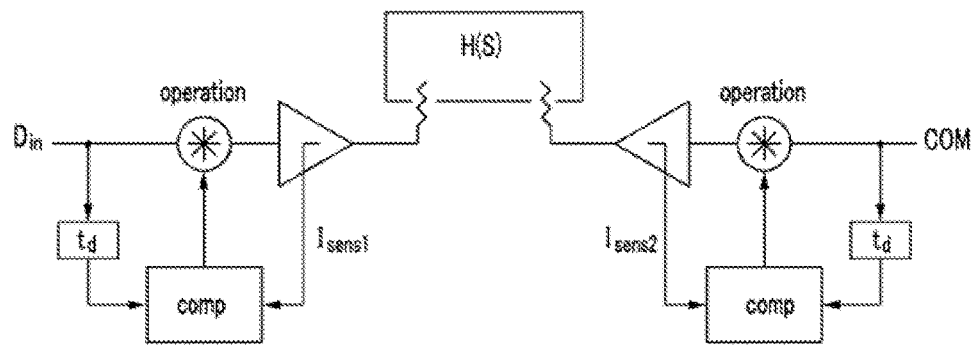

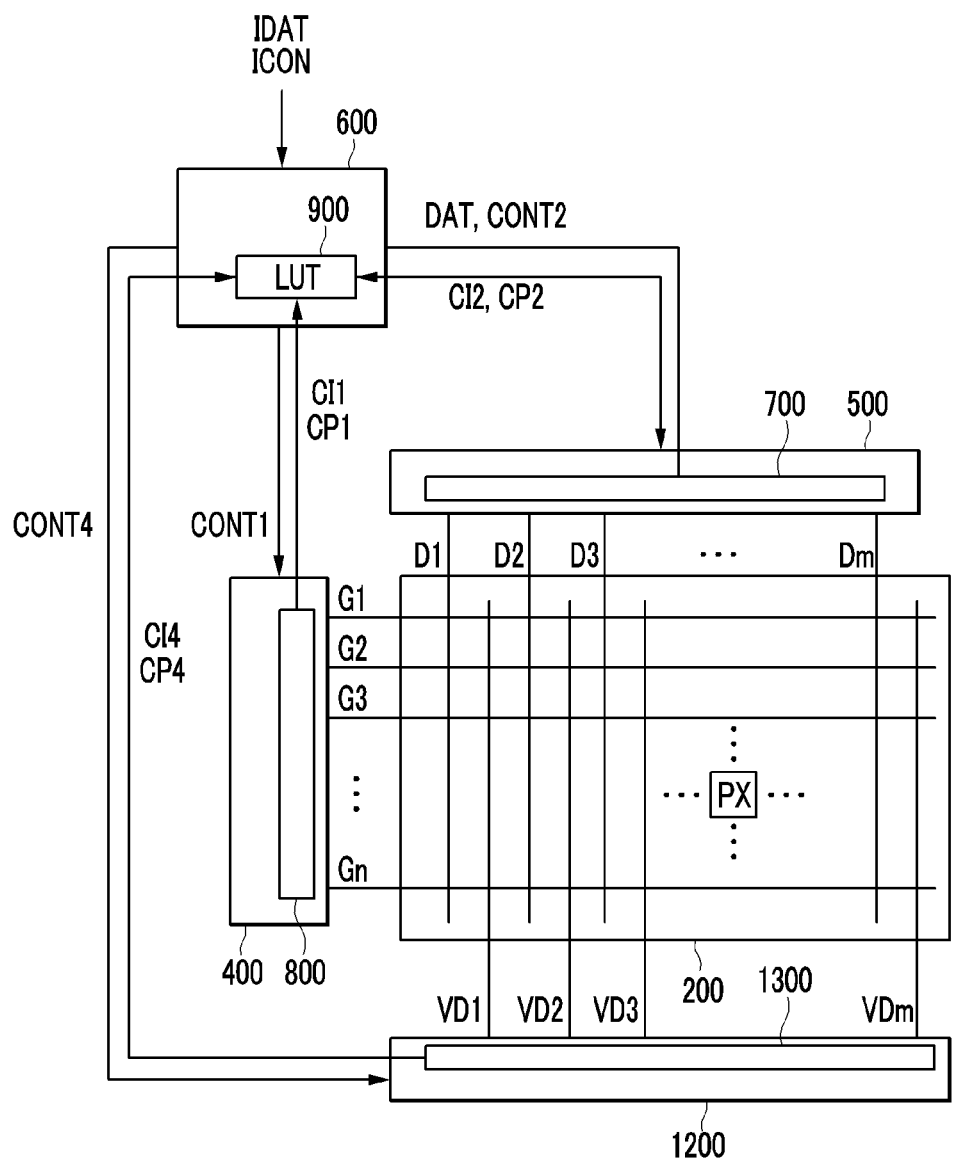
[FIG. 13]

[FIG. 14]
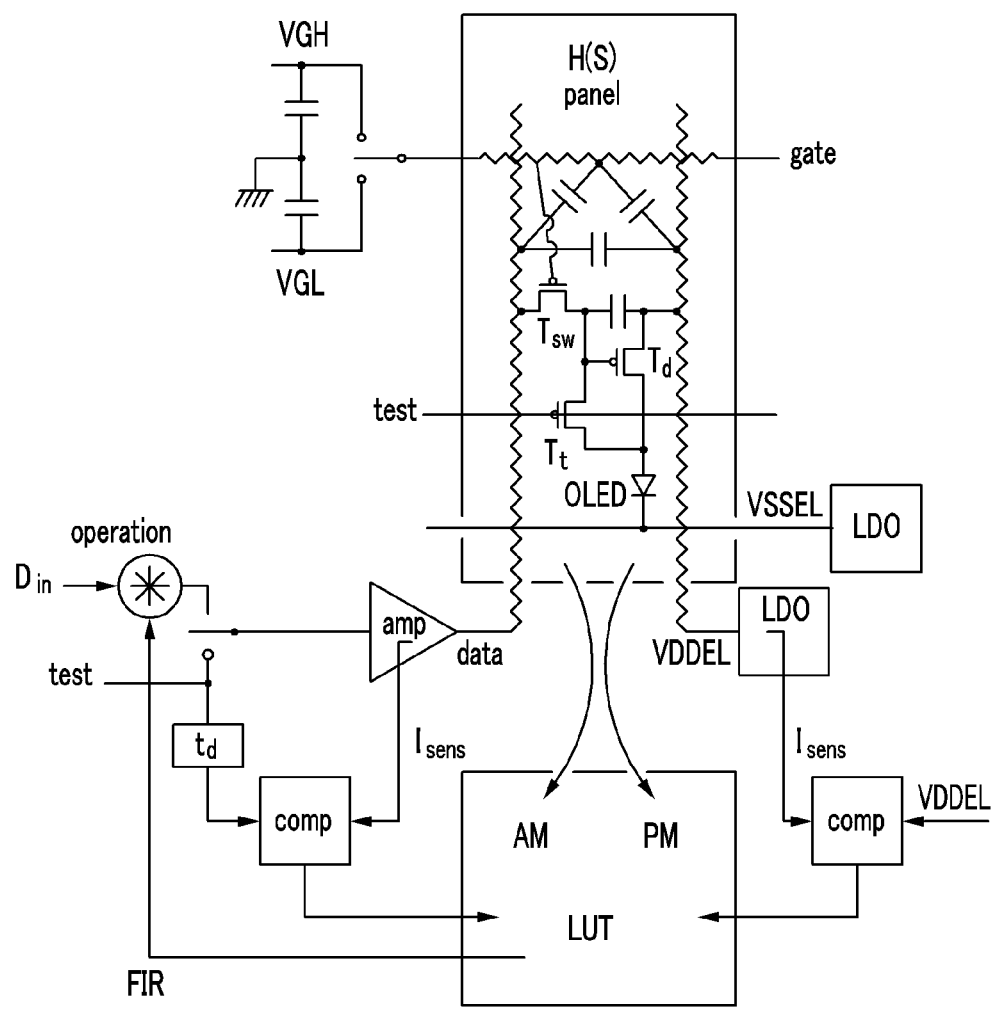

[FIG. 15]
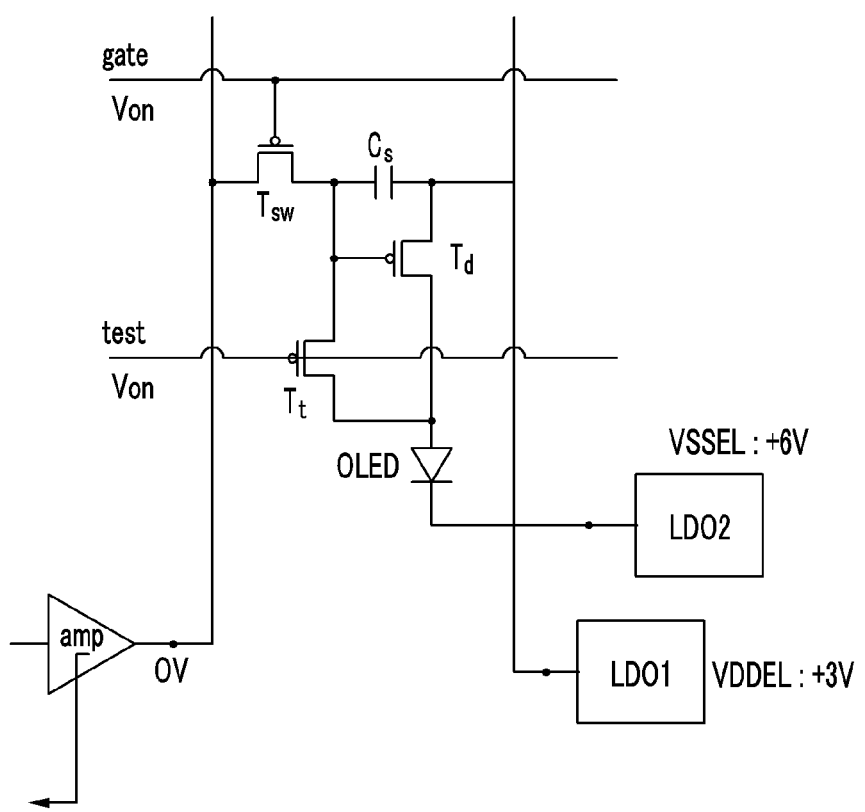

[FIG. 16]
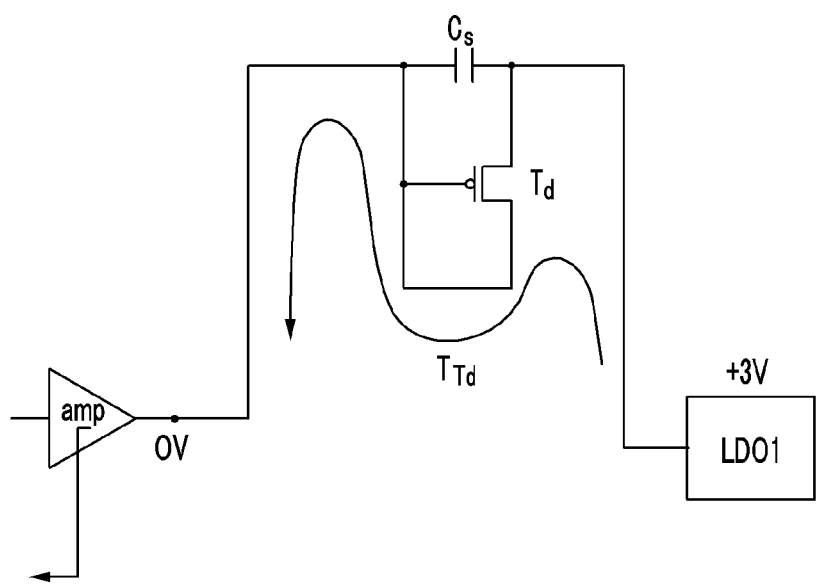

【FIG. 17】
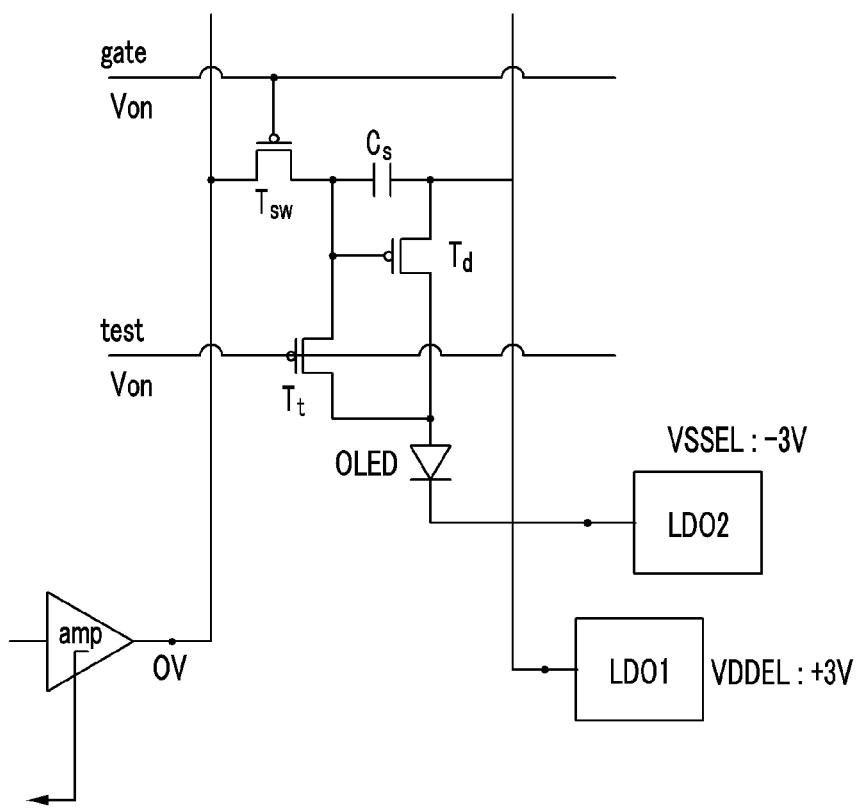

【FIG. 18】
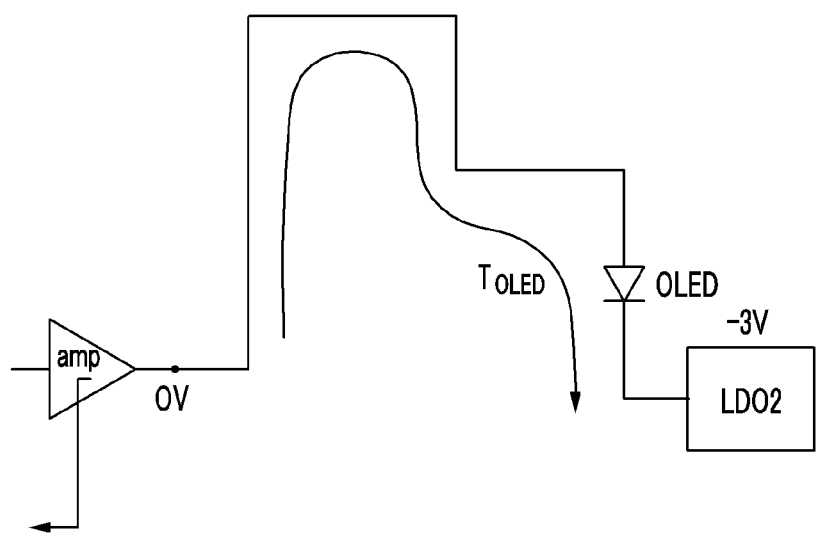

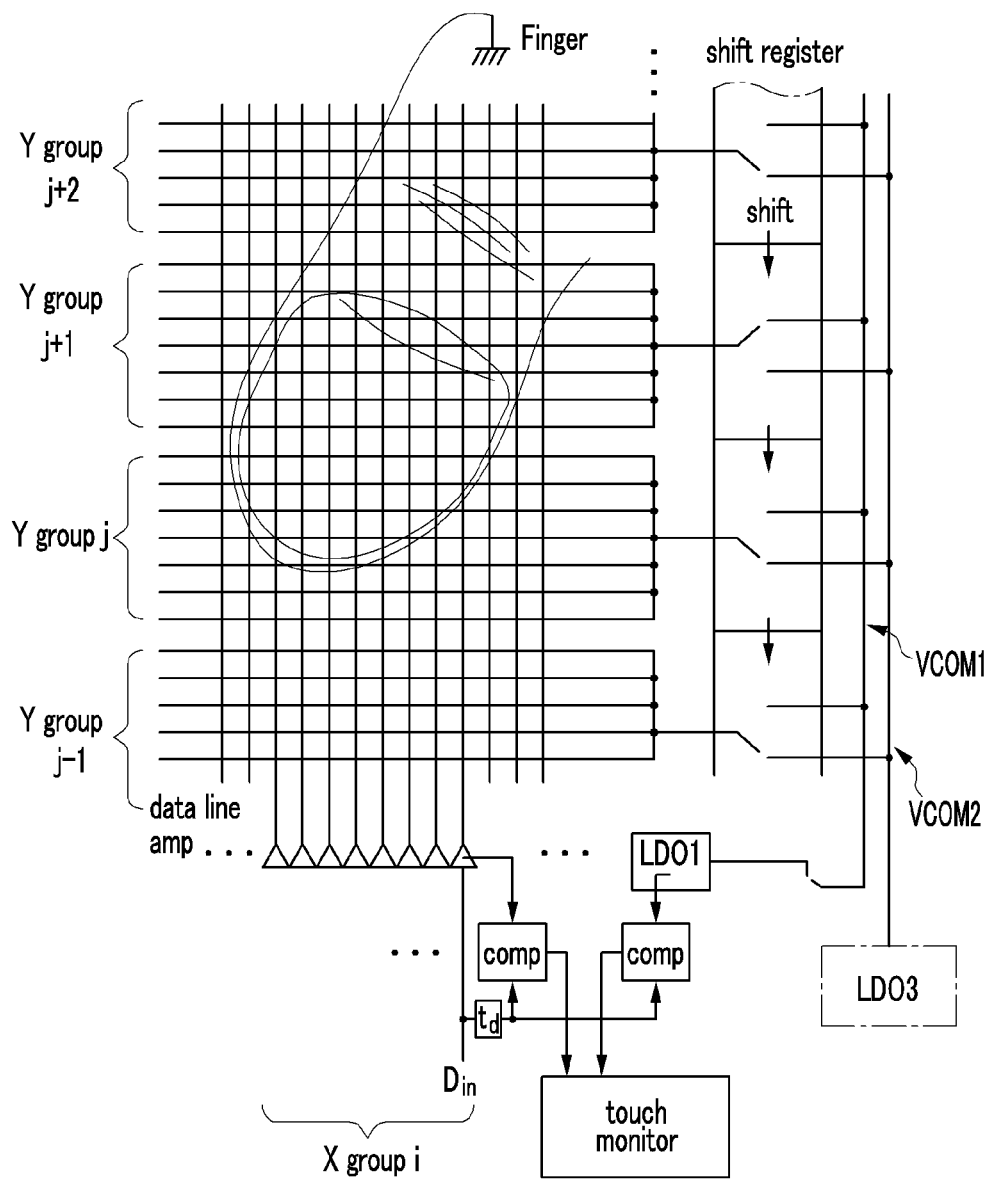
[FIG. 19]

[FIG. 20]
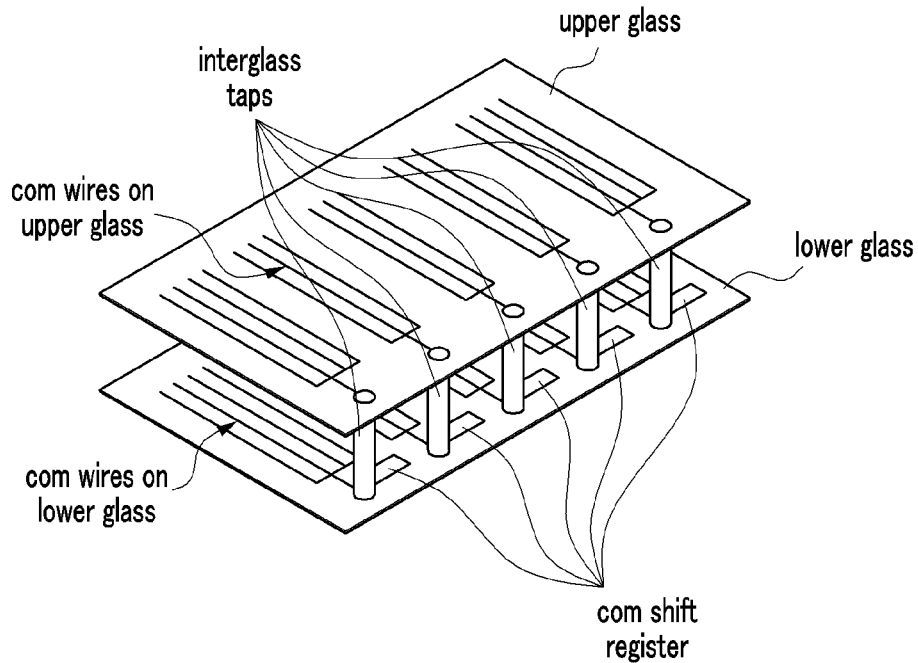
[FIG. 21]
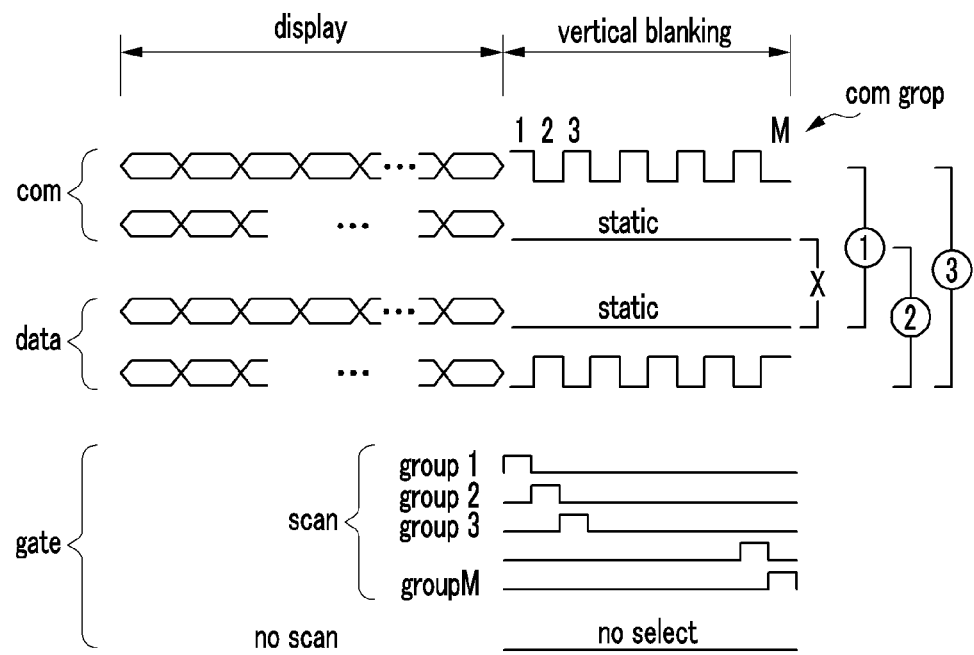

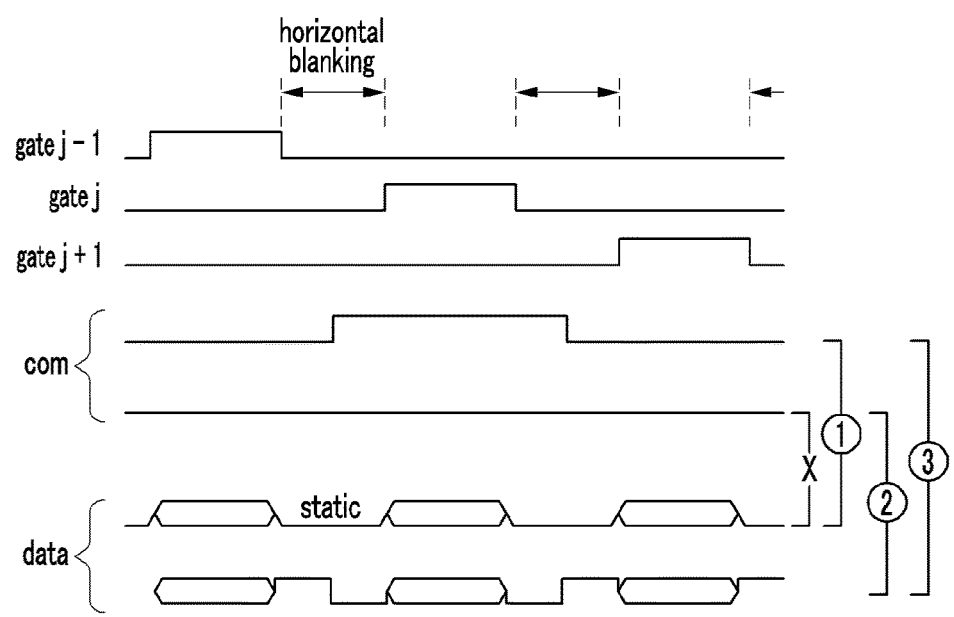
[FIG. 22]

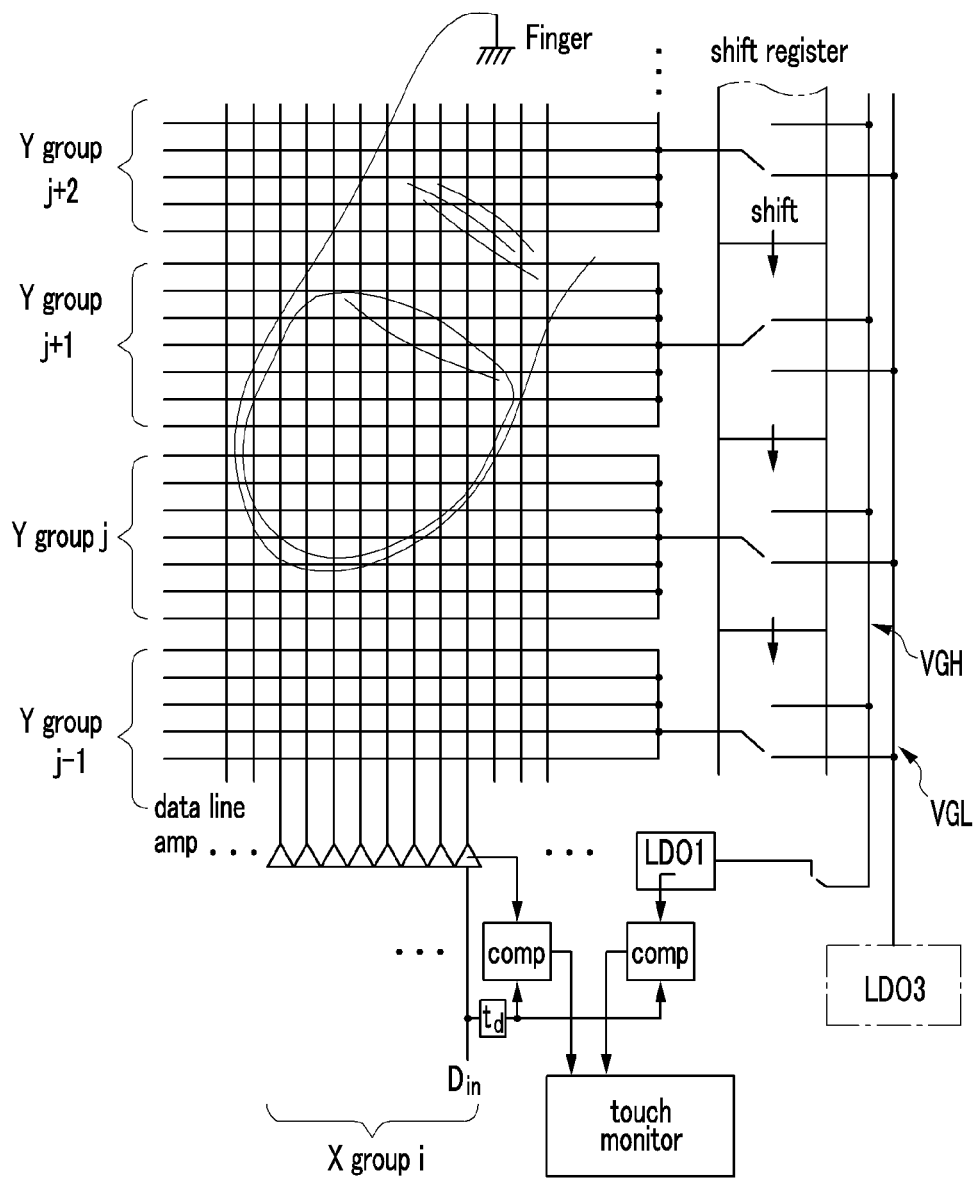
[FIG. 23]

DISPLAY AND TOUCH PANELS WITH DRIVE AND SENSE TECHNIQUES

CROSS-REFERENCE TO RELATED APPLICATION

This application is a Divisional Application of U.S. patent application Ser. No. 14/354,620 filed Apr. 28, 2014, which is a National Stage application of PCT/KR2012/008972 filed on Oct. 30, 2012, which claims priority to U.S. Patent Application 61/553,234 filed on Oct. 30, 2011.

TECHNICAL FIELD

The present invention relates to display devices and touch panels with drive and sense techniques.

BACKGROUND ART

As information technology (IT) products are required to have high quality and slim size, a corresponding display with high image quality and thin thickness is also required. Liquid crystal displays (LCD's) and organic light emitting diode displays (OLED's) are commonly employed as such a display.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

However, since the LCD's and OLED's are produced by complicated processes such as photolithography and etching and have a lot of tiny electric elements such as wires, thin film transistors, and electrodes, it is very hard to make the whole electric elements with uniformity. Further, as the electric elements get ageing, their performances change. Therefore, for a uniform and high image quality, compensating respective pixels while driving the LCD's and OLED's is required. To compensate respective pixels, monitoring states of the respective pixels is essential. However, there is no known way to monitor states of the respective pixels yet.

Solution to Problem

An exemplary embodiment of the present invention provides a display device comprising: a display panel including a data line, a gate line, and a pixel; a data driver configured to output a data signal to the data line; a gate driver configured to output a gate signal to the gate line; and a signal controller configured to control the data driver, and the gate driver, wherein at least one of the data driver and the gate driver comprises a first current monitoring unit configured to monitor output current of the at least one of the data driver and the gate driver.

Another exemplary embodiment of the present invention provides a display device comprising: a display panel including a plurality of data lines, a plurality of gate lines, a plurality of common electrode lines, and a plurality of pixels; a data driver configured to output data signals to the data lines and comprising a first current monitoring unit configured to monitor output current of the data driver; a gate driver configured to output gate signals to the gate lines; a common voltage driver to output common voltages to the common electrode lines including a second current monitoring unit configured to monitor output current of the common voltage driver; a signal controller configured to control the data driver, the gate driver, and the common voltage driver and comprising; and a touch monitor determining whether a touch is applied or not, and where the touch is applied, if any, by using current monitoring results of the first current monitoring unit and the second current monitoring unit.

Another exemplary embodiment of the present invention provides a display device comprising: a display panel including a plurality of data lines, a plurality of gate lines, and a plurality of pixels; a data driver configured to output data signals to the data lines and comprising a first current monitoring unit configured to monitor output current of the data driver; a gate driver configured to output gate signals to the gate lines and comprising a second current monitoring unit configured to monitor output current of the gate driver; a signal controller configured to control the data driver, the gate driver, and the common voltage driver and comprising ; and a touch monitor determining whether a touch is applied or not, and where the touch is applied, if any, by using current monitoring results of the first current monitoring unit and the second current monitoring unit.

Advantageous Effects of Invention

According to an examplary embodiment of the present invention, by monitoring driving current of a display device, compensated driving may be applied. Further, an imbeded touch sensing operation may be implemented to a display device.

BRIEF DESCRIPTION OF DRAWINGS

FIG. 1 is a block diagram of a liquid crystal display (LCD) according to an exemplary embodiment of the present invention.

FIG. 2 is a circuit diagram of a current replication unit according to an exemplary embodiment of the present invention.

FIG. 3 is a circuit diagram of a current replication unit according to another exemplary embodiment of the present invention.

FIG. 4 is a circuit diagram of a charge integrator according to an exemplary embodiment of the present invention.

FIG. 5 is a circuit diagram of a charge integrator according to another exemplary embodiment of the present invention.

FIG. 6 shows current peak graphs with various RC delays.

FIG. 7 is a circuit diagram of a current peak detector according to an exemplary embodiment of the present invention.

FIG. 8 is a signal wave form diagram of the current peak detector of FIG. 7.

FIG. 9 is a schematic diagram of an LCD according to another exemplary embodiment of the present invention.

FIG. 10 is a signal wave form diagram of the LCD of FIG. 9.

FIG. 11 is a schematic diagram of an LCD, according to another exemplary embodiment of the present invention, with current monitoring and calibration units.

FIG. 12 is a simplified schematic diagram of a LCD, according to another exemplary embodiment of the present invention, with current monitoring and calibration units.

FIG. 13 is a block diagram of an organic light emitting diode (OLED) display according to an exemplary embodiment of the present invention.

FIG. 14 is a schematic diagram of an OLED display, according to another exemplary embodiment of the present invention, with current monitoring and calibration units.

FIG. 15 is a circuit diagram of an OLED display to measure current of a driving thin film transistor (TFT).

FIG. 16 is an equivalent circuit diagram of FIG. 15.

FIG. 17 is a circuit diagram of an OLED display to measure current of an organic light emitting diode.

FIG. 18 is an equivalent circuit diagram of FIG. 17.

FIG. 19 is a schematic diagram of an LCD with imbedded touch sensing operation, according to an exemplary embodiment of the present invention.

FIG. 20 is a simplified perspective view for showing common electrodes of an LCD with imbedded touch sensing operation, according to another exemplary embodiment of the present invention.

FIG. 21 is a signal wave form diagram of the LCD of FIG. 19 performing touch sensing operation during vertical blank period.

FIG. 22 is a signal wave form diagram of the LCD of FIG. 19 performing touch sensing operation during horizontal blank period.

FIG. 23 is a schematic diagram of an OLED display with imbedded touch sensing operation, according to an exemplary embodiment of the present invention.

BEST MODE FOR CARRYING OUT THE INVENTION

A display panel may be modeled as matrices of Resistor-Capacitor (RC) network including active matrix display elements of TFT switch and combination of storage and liquid crystal (LC) capacitors in LCD display and of TFT switch, combination of storage capacitor, current driving TFT and OLED in OLED display, and passive matrix elements of wires with parasitic resistances and capacitances. These passive matrix elements cause non-ideal location dependent artifacts on display. Then, if location dependent characteristic of passive matrix is known, input data can be manipulated accordingly to write right value at display elements (pixels).

The display panel is driven by voltage switching which results in transient current in pulse shape. Amount of the transient current is proportional to the amount of switching activities. Sensing of the transient current may be simultaneously performed during the voltage driving. The transient current may be sampled in most voltage amplifiers and Low Drop-Out voltage regulators (LDO) by adding current replicating field effect transistors (FET's) at the output stage. This transient current sampling circuit is much simpler and smaller than a usual current measuring circuit. The sampled transient current may be analyzed in two ways. One is charge integration that is accumulating charges over certain time and resulting in average and the other is peak detection identifying peak current and the time of peak.

Characterization of passive matrix elements of a display panel is performed based on the followings. Wire configurations of LCD and OLED display are almost same. All wires are driven by a voltage amplifier or an LDO. Accordingly, the transient current can be measured at the driver without extensive efforts. Location dependency of transient current may be stored as a map of the pair of propagation delay and attenuation. A lookup table LUT1 is used to store the characteristics of the passive matrix elements. The LUT1 may be applied on multiple cases such as calibration of LCD display including variation of line time (Y scan) and cross-talk compensation (X scan), touch sensing in normal display panel.

When the panel is driven by the reference stimulus with which the LUT1 was collected, the deviation of measured response from LUT1 shows external interference such as a finger because a finger deprives returning charge.

Characterization of OLED and current driving TFT in OLED display is also possible. When OLED and TFT are characterized by current pulse monitoring, TFT and OLED read, which depends on the location of the pixel, may be calibrated by referring LUT1 which stores the characteristics of the passive matrix elements. Other lookup tables LUT2 and LUT3 may be employed to store the differences of TFT and OLED from a reference TFT and OLED in the panel respectively. LUT2 and LUT3 may be used to calibrate input data before being applied to display circuitry.

Characterization of active matrix elements of an LCD panel is impractical. Characterization of turn-on resistance and leakage of the switch TFT is practically impossible because the values are extremely high and low respectively. So, active matrix characterization of an LCD panel is also impractical. However, in OLED display panel, the current driving capabilities of TFT and OLED are important parameters, and can be measured with pulse current measurement.

Calibrated driving of display panel is applicable according to the present invention.

In an LCD, by monitoring transient current at data driving amplifier, common voltage LDO (or amplifier), and gate voltage supplier with executing Null scan, Y scan, and X scan and by tabulating location dependent response difference ( propagation delay and attenuation), LUT1 characterizing of passive matrix elements is generated. And, a calibration such as variation of scan time may be performed.

In an OLED display, by monitoring transient current at data driving amplifier, common voltage LDO (or amplifier), and gate voltage supplier with executing Null scan, Y scan, and X scan and tabulating location dependent response difference ( propagation delay and attenuation), LUT1 characterizing of passive matrix elements is provided. Further, characterization of active matrix elements is possible. For this, a test TFT in the pixel to connect data line to drain of driving TFT and anode of OLED is needed. Transient currents of active matrix elements are able to be monitored at data driving amplifier. By applying a higher voltage to VSSEL terminal, OLED is turned off. Then, current of driving TFT is monitored. By applying a lower voltage to VDDEL terminal, driving TFT is turned off. Then, current of OLED is monitored. Location dependency of transient currents of driving TFT and OLED is compensated by subtracting the transient currents of passive matrix elements. Characteristic differences of transient currents of driving TFT and OLED are tabulated to make LUT2 and LUT3. For driving TFT current, the difference at each pixel with respected to the minimum or the maximum of a panel is stored. For OLED current, the difference at each pixel with respect to the maximum of a panel is stored. With this, calibration such as scaling LUT2 and LUT3 based on input gray level and applying the scaled difference onto the input may be performed.

A display panel according to the present invention is able to perform display and touch sensing together. Display is performed by driving active matrix elements and touch sensing is performed by monitoring passive matrix elements while active matrix elements displaying. Touch sensing is performed by sensing transient currents while voltage switching. Two types of voltage stimulus may be applicable. One is a predefined reference (usually square wave) for simple measurement and the other is display data itself. When the latter is applied, subtracting scheme to remove the display contents from sensed transient currents is needed.

Mode for the Invention

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

First, an LCD according to an exemplary embodiment of the present invention will be described with reference to FIG. 1.

FIG. 1 is a block diagram of a liquid crystal display (LCD) according to an exemplary embodiment of the present invention.

An LCD according to an exemplary embodiment of the present invention includes a signal controller 600 (Tcon), a data driver 500, a gate driver 400, a common voltage driver 1000, and a display panel 300.

The display panel 300 includes two substrates (not shown) and a liquid crystal layer (not shown) interposed between the two substrates. One of the two substrates includes a plurality of gate lines (G1, G2, G3 Gn), a plurality of data lines (D1, D2, D3 Dn), a plurality of common electrode lines (Com1, Com2, Com3 . . . ComN), and a plurality of pixels PX that respectively have at least a pixel electrode (not shown) and a TFT (not shown). The other substrate may include a common electrode (not shown) as an opposite electrode of the pixel electrode. The common electrode lines (Com1, Com2, Com3 ComN) may be omitted when a liquid crystal capacitance formed between the pixel electrode and the common electrode is large enough or a storage capacitance is provided by the gate lines (G1, G2, G3. . . Gn).

The signal controller 600 receives an input image signal and an input control signal for controlling a display thereof from an outside, and generates an output image signal DAT, a gate control signal CONT1, a data control signal CONT2, a common control signal CONT3 and the like based on the above signals. Examples of the input control signal include a vertical synchronization signal, a horizontal synchronization signal, a main clock signal, a data enable signal and the like. The signal controller 600 transmits the generated gate control signal CONT 1 to the gate driver 400, transmits the data control signal CONT2 and the output image signal DAT to the data driver 500, and transmits the common control signal CONT3 to the common voltage driver 1000. The gate control signal CONT1 includes a vertical synchronization start signal STV for instructing an output start of a gate-on pulse and vertical clock signals CPV1 and CPV2 for controlling an output time of the gate-on pulse. The data control signal includes a horizontal synchronization start signal STH for instructing an input start of the output image signal DAT and a load signal TP for applying a corresponding data voltage to a data line. The common control signal CONT3 includes an inversion control signal. The signal controller 600 includes a calibration unit 900 having a lookup table LUT to modify the output image signal DAT, gate control signal CONT1, data control signal CONT2, common control signal CONT3 and the like based on information stored in the lookup table LUT.

The data driver 500 receives the output image signal DAT for one pixel row according to the data control signal from the signal controller 600, converts each output image signal DAT to an analog data voltage, and then applies the converted analog data voltage to a corresponding data line. The data driver 500 includes a data current monitoring unit 700 to identify characteristics of current flowing the data lines D1, D2, D3 . . . Dn.

The gate driver 400 generates a gate-on voltage and a gate-off voltage by using the gate pulse start signal STVP and the pair of vertical clock signals CPV1 and CPV2, and applies the generated gate-on voltage and gate-off voltage to a gate line according to timing. The gate driver 400 may be an amorphous silicon gate (ASG) directly formed on the display panel 300, together with a gate line, a data line, a switching device and the like. The gate driver 400 includes a gate-on voltage suppler and a gate-off voltage supplier (not shown) to apply the gate-on voltage and gate-off voltage to a gate line according to timing. The gate driver 400 includes a gate current monitoring unit 800 to identify characteristics of current flowing the gate lines (G1, G2, G3 . . . Gn).

The common voltage driver 1000 generates a pair of common voltages which have inverted polarities by using the inversion control signal and alternatively applies the generated common voltages to the common electrode lines (Com1, Com2, Com3 ComN) and the common electrode. The common voltage driver 1000 includes a high voltage supplier and a low voltage supplier (not shown) to alternatively apply the common voltages to the common electrode lines (Com1, Com2, Com3 ComN) and the common electrode. The common voltage driver 1000 includes a common current monitoring unit 1100 to identify characteristics of current flowing the common electrode lines (Com1, Com2, Com3 ComN).

The calibration unit 900 receives current monitoring results CI1, CP1, CI2, CP2, CI3, and CP3 from the gate current monitoring unit 800, data current monitoring unit 700, and common current monitoring unit 1100 and stores the current monitoring results CI1, CP1, CI2, CP2, CI3, and CP3 in the lookup table LUT after conducting some processes to the current monitoring results CI1, CP1, CI2, CP2, CI3, and CP3. The current monitoring results CI1, CP1, CI2, CP2, CI3, and CP3 includes charge integration value CI1, CI2, and CI3 and current peak data CP1, CP2, and CP3. The calibration unit 900 compensates signals DAT, CONTI, CONT2, and CONT3 provided to the gate driver 400, the data driver 500, and the common voltage driver 1000 with referring the lookup table LUT.

The data current monitoring unit 700 includes a current replication unit and a characteristic measure unit which comprises at least one of a charge integrator and a current peak detector. The data driver 400 comprises operational amplifiers for data voltage outputting.

FIG. 2 is a circuit diagram of a current replication unit, according to an exemplary embodiment of the present invention, inserted in an amplifier.

When an amplifier is configured with negative feedback, the change of the load results in a change of supply current at the output stage of the amplifier.

As shown in FIG. 2, if the amplifier is equipped with replica FET's 710 at the output stage, the replicated output current IsensP and IsensN can be fed to a characteristic measure unit 720 of the data current monitoring unit 700. Here, control terminals of the replica FET's 710 is connected to a pre-amplifier that controls data signals output to the data line. The amount of the replicated output current IsensP and IsensN may be controlled by differentiating the size ratio of the FET's between the replicating side and the OP amp output side. So, if a driving amplifier is equipped with a replica FET, any driver can monitor its own output current while driving the load.

The gate current monitoring unit 800 also includes a current replication unit and a characteristic measure unit which comprises at least one of a charge integrator and a current peak detector. The gate driver 400 may comprise Low Drop-Out voltage regulators (LDO) for gate voltage outputting.

FIG. 3 is a circuit diagram of a current replication unit, according to another exemplary embodiment of the present invention, inserted in an LDO.

LDO is one of the devices that keep output voltage constant with negative feedback. Most of the LDO has output FET at only one side, but same replication scheme may be applied.

The replication FET 810 is connected to the LDO in parallel to the output FET.

Through the replication FET 810, replicated output current Isens is fed to measure unit 820 of the gate current monitoring unit 800. The amount of the replicated output current Isens may be controlled by differentiating the size ratio between the replicating FET 810 and the output FET.

The common current monitoring unit 1100 may be embodied with any type of the current replication units of FIGS. 2 and 3. Further, the gate current monitoring unit 800 may be embodied with the current replication unit of FIG. 2.

Because the replicated output current is in pulse shape, there are two ways in measuring current.

One is integrating current in a capacitor for a period of time. It results in the charge accumulated in the time interval. The other is detecting the peak value by sampling the current pulse with a fixed time step. It results in peak current values and the time steps when the peak appears.

FIGS. 4 and 5 are circuit diagrams of charge integrators according to exemplary embodiments of the present invention.

Referring FIG. 4, the replicated output current IsensP and IsensN are alternatively forwarded, by operation of switches SW1 and SW2, to a capacitor Ci of which voltage is measured by a voltage meter VM. The circuit portion PC composed of a resister and a capacitor is for phase compensation. Any type of charge pump can be used. FIG. 4 illustrates one type of charge pump.

Referring FIG. 5, the replicated output current Isens is forwarded to a capacitor Ci of which voltage is measured by a voltage meter VM.

The stored charge in the capacitor Ci appears as voltage of the capacitor Ci. The analog voltage can be directly evaluated as analog current in an analog signal processing system, while it can be converted to digital value for digital signal processing.

FIG. 6 shows current peak graphs with various RC delays.

In case when the load has distributed resistance and capacitance, the output current shape depends on the configuration of the load as shown in FIG. 5. Propagation delay is one of key parameters of the distributed load. It can be measured by counting time steps from the assertion of step stimulus to the time when the peak appears.

FIG. 7 is a circuit diagram of a current peak detector according to an exemplary embodiment of the present invention. FIG. 8 is a signal wave form diagram of the current peak detector of FIG. 7.

A peak detector is shown in FIG. 7. The peak detector is operated as follows:

Controls at odd time steps: ro ->reset C1 ->sample current pulse Isens at C1 and applies its voltage to the input of comparator;

Controls at even time steps: re ->reset C2 ->sample Isens at C2 and applies its voltage to the input of comparator;

Switch matrix selects the voltage sampled at earlier time step at positive input of the comparator, while selecting the voltage sampled at later time step at the negative input.

Referring FIG. 7, RST resets the output of all counters and comparator. While the sampled voltage monotonously increases, the output of comparator O stays low. After RST goes low, counter 1 begins counting and updates the value T. When the later sample is smaller than the previous sample, the comparator output O goes high, and counter enables E1 and E2 goes high and low respectively. Then switch matrix freezes and the previous sampled capacitor begins discharge by the current source It. E1 high stops counter 1 to hold the final value T. T represents the number of time steps when peak occurs. E2 low has counter 2 run to update the value V. When It discharges the peak charge, the comparator output O goes low again, and E2 goes high to stop the counter 2. The final value V represents the peak value, Ipeak=V*It (discharge: It*V*dt=Ipeak*dt: charge, where dt=time step, V=number of steps).

In other words, peak detector of FIG. 7 repeatedly resets and charges C1 and C2 with a predetermined interval and has the comparator compare voltages of C1 and C2 to determine whether the voltages monotonously increase or decrease. According to the determination, the peal detector detects the inflection point as Ipeak. The peak detector counts clocks and measures current of discharge to calculate amount of Ipeak.

The circuit of the peak detector is simple and small enough to be integrated into data driving amplifier. The peak value and peak time are generated directly as a pair of digital numbers.

Monitoring supply current gives information on the activity of the system. The supply current pulses occur whenever the switching action happens in the system. The amount of charge delivered depends on the amplitude of transition. So, accumulation of those current pulses for a given period of time results in an average current (total charge divided by the period). So, the accumulated current pulse value can be used as the measure of activities or load change.

In a display system, when its supply current is averaged over a line time, the accumulated value represents average brightness of the line. Averaging over a frame results in average brightness of the frame. This may be used as a simple analog method in estimating brightness of the display system, while a digital approach needs a big accumulating logic circuit. The average brightness may be used in (1) back light control in LCD panel and (2) dimming of OLED panel.

When the load estimation and the current peak detection are combined, the supply system can be dynamically configured to supply current with a guard band.

FIG. 9 is a schematic diagram of an LCD according to another exemplary embodiment of the present invention. FIG. 10 is a signal wave form diagram of the LCD of FIG. 9.

An LCD display panel has array of TFTs, capacitors and wires. The wires include gate lines to select pixel, data lines to apply analog voltage onto pixel, common electrode lines which are counter electrodes against pixel electrodes.

Parasitics of wires build a mesh of RC network composed of wire resistance itself and coupling capacitors among wires. Accordingly, as shown in FIG. 9, a pixel is modeled with wires parasitics and active components of the switch TFT, storage capacitor, and capacitance of liquid crystal between the pixel electrode and common electrode.

The wires are tied to amplifiers and LDO's. The gate line is tied to an output of a shift register of a gate driver on panel. The gate line signal swings between VGH and VGL levels. VHG is high voltage to select pixels. The data line is tied to an output of a data driving amplifier and applies gray levels to selected pixels. RGB demultiplexer may be inserted in LTPS panel between the data line and the output of the data driving amplifier. The common electrode line is tied to an output of a selection switch. The voltage of the common electrode line swings between VCOMH and VCOML in a line inversion panel (FIG. 9) or is static at VCOM (usually close to VCOML) in a dot inversion panel.

Referring FIG. 10, when voltage transition happens on the wires, to change the voltage of the capacitors, transient current pulse Ic, Id, Igl, and Igh also happens. Because the display is an RC network, the current pulse has sharp leading edge while the trailing edge is slow as same as the voltage change of the capacitors.

On the other hand, the supply current appears as a big pulse on the supply wire. This supply current returns through the other wires. So, the other wires also have current pulse with smaller magnitude because of the return current spread among wires. Accordingly, transient current may be measured by the other wires.

FIG. 11 is a schematic diagram of an LCD, according to another exemplary embodiment of the present invention, with current monitoring and calibration units.

A display panel is a two dimensional array of pixels that are connected through array of electrical wires. They are called the gate line, data line and common electrode line in an LCD display.

An active matrix display has switch element (usually TFT) that controls the connection of a pixel to the data line. Because the pixels and wires are packed in a tight space, the wires have finite parasitic resistances. The wires are also coupled each other through inter-wire parasitic capacitances. In FIG. 11, the distributed parasitic resistances and capacitances on the gate line, data line and common electrode lines are illustrated as lumped elements. So, in electrical perspective, the display panel is treated as an RC network system. The system characteristic function of the panel may be denoted as H(s). As the system is composed of active elements matrix (AM, active matrix) and wire-connected matrix (PM, passive matrix), they are represented as Ha(s) and Hp(s) respectively.

At the end of each wire, the amplifier or LDO is connected to drive the wire at a specified voltage level. Since all the wires are usually switched among predefined analog voltages at a specified time in a display frame, the voltage transition appears as a step. When a step voltage is applied on an RC network, the voltage source exerts impulse current.

When the current monitoring function is added at the amplifiers and LDO, the driving currents are able to be measured while the wires are driven by the step voltage sources. Because parameters of the driving current depend on the system characteristic function, by measuring driving current at every incidents of voltage transition, we can characterize system function.

In case when the wire is connected to mere a stabilizing capacitor without LDO, a current measuring circuit may be inserted in series with the wire. In FIG. 11, the doted closed loops 11, 12, and 13 represent the current measuring circuits which may be omitted.

In FIG. 11, the current sampled at LDOH and LDOL, which are voltage regulators of the gate lines, may also be provided to LUT to generate the system characteristic function H(s).

FIG. 12 is a simplified schematic diagram of a LCD, according to another exemplary embodiment of the present invention, with current monitoring and calibration units.

Usually, when one set of wires switches, the rest of wires, which are connected to other amplifiers and LDO's, stay at stable voltage. In the example of FIG. 12, the common electrode line is one of the counter electrodes when the data lines are switching, and it stays at a static voltage level. We can measure the response current of these static amplifiers or LDO at the moment of switching. The sum of the rest wires is the average response of the switching wires.

Optionally, the response current of LDO that supplies power to the amplifiers may be measured. In case when multiple amplifiers are supplied by a single LDO, this LDO current response represents the average response of those multiple amplifiers.

The average response may be used as the simple estimation of the pixel brightness in a group. If it is measured over a horizontal line period, it represents average pixel brightness in a row. If it is accumulated over the frame time, it represents frame brightness. By accumulating some horizontal lines, we can estimate the brightness of a band of rows. If it is combined with the measurement at the data line amplifiers in column, we can estimate the brightness of a block of pixels in two dimension.

By comparing the measured response and the applied stimulus, how the system (distributed RC network) responds to the input may be identified. How the individual pixel is different from the rest of pixels may also be identified. All the pixels in a display panel are supposed to be the same, but they differ by some extent in real panel. If the difference is too big, the panel should be discarded. So, by identifying the difference and compensate it, the productivity may be increased significantly.

As an RC network imposes a certain delay, there should be an adjustable delay element on input before it is compared with the monitored driving current.

For the purpose of characterizing system, a test input is applied to the system. The test input is a combination of simple stimuli whose responses are well analyzed.

Once the characteristic of the panel is identified in the form of difference from the ideal response, it can be stored as a lookup table (LUT). LUT can be built in two parts: PM for characteristic of wires and AM for TFT and pixel characteristics. When the real display data is applied, an operating block (calibration unit 900 in FIG. 1) applies correction on the input data by referring LUT.

It is hard to measure turn-on resistance of a TFT and turn-off leakage of the TFT. Accordingly, it is hard to characterize TFT parasitic. However, pixel capacitances can be measured as part of the wire parasitic. Pixel parasitics include storage and LC capacitances. The pixel parasitics appear as location dependent capacitances with scanning. The scanning may be performed by selecting pixels in normal way (one row a time) or by selecting a group of pixels in multiple row. For the latter, change of the shift register is required.

To measure wire parasitic, null driving is executed first. The null driving means driving display panel without selecting any pixel. For the null driving, a special operation mode, driving without clocking the gate shift register, is needed. This is to measure the pure response of the wire parasitics without pixel parasitics. Data lines are driven with a set of analog voltage levels (low gray, mid gray, high gray). Then, store the characteristics of response current as the reference response per each analog level. The charge integration tells total capacitance involved. The peak detection tells total resistance involved with the capacitance above.

Secondly, Y scan is executed. Y scan may include two types.

In type 1, the display panel is driven in the same way as the normal display mode.

The same analog voltage levels of the null driving are applied. The response current changes as the location of selected pixel row progresses because circuit road, resistance and capacitance, is changed depend on the position. Then, the peak value and peak time of the response current are measured per each row. The peak value tells how much attenuation was exercised until the signal reaches to the selected position, while peak time tells the propagation delay to the position.

In type 2, the display panel is driven with scanning group of gate lines together. In case when pixel capacitance is small, by selecting multiple rows, the capacitance may be increased. With this, the location dependent response may be measured more easily. For this, change of the gate shift register is needed.

Thirdly, X scan to characterize the wires that are laid out in horizontal direction (X direction) is executed. With applying a specific analog value to a data line driver while the rest of the drivers are set at the same low value, the data driver is scanned by applying the specific analog value in sequence. The specific analog value may be simultaneously applied onto a group of drivers to increase the amount of response. Summation of currents in a group is very easy because the replicating FET's work as current sources.

Comparing the responses is performed to characterize display panel. The responses are compared with that of the null driving. The responses may be compared with the response of the first row (farthest row from the data line amplifier). This corresponds to comparing with the slowest response and is almost same as the null driving. This may be done without modification of normal control. The responses may be compared with the response of the last row (closest row from the data line amplifier). This corresponds to comparing with the fastest response. The responses may be measured by skipping some rows because the difference is very gradual due to the distributed nature of parasitic. Skipping some rows reduces the data size of the lookup table to be stored.

Variable line time optimization may be performed with the information achieved by the foregoing processes. Since farther row needs longer time to charge, longer time may be allocated for farther row, and the horizontal line time may be reduced as rows closer to the driving amplifier. The variable horizontal line time can be generated by referring the measured time in the LUT. Coarse time steps with approximation can be stored in the LUT.

Aforementioned schemes are applicable to an OLED display because of structural similarity between LCD and OLED display.

In detail, OLED display is structurally different from LCD in that an OLED is added;

a current driving TFT is added; OLED supply lines are added; VDDEL lines instead of common electrode lines are included; and VSSEL electrode is added. However, OLED display is structurally similar to LCD in that data line driving is the same; switching TFT is basically the same; and storage capacitor is connected through the switch TFT. Data line driving is similar to LCD when VDDEL lines are regarded as common electrode lines.

An extra TFT switch is required in each pixel to characterize current of driving TFT and OLED separately. The extra TFT switch is connected between the drain of the switching TFT and a node between the drain of the driving TFT and anode of the OLED are tied. The response of driving TFT and OLED when data line is switching may be measured by utilizing the scheme of drive and sense. No DC value measuring circuit is required.

FIG. 13 is a block diagram of an organic light emitting diode (OLED) display according to an exemplary embodiment of the present invention. FIG. 14 is a schematic diagram of an OLED display, according to another exemplary embodiment of the present invention, with current monitoring and calibration units.

Referring FIG. 13, an OLED display according to an exemplary embodiment of the present invention includes a signal controller 600, a data driver 500, a gate driver 400, a VDDEL voltage driver 1200, and a display panel 200.

Referring FIGS. 13 and 14, the display panel 200 includes at least one substrate. The substrate includes a plurality of gate lines (G1, G2, G3 Gn), a plurality of data lines (D1, D2, D3 Dn), a plurality of VDDEL lines (VD1, VD2, VD3 VDm), a plurality of test lines, and a plurality of pixels PX that respectively have at least an OLED, a switching TFT (Tsw), a driving TFT (Td), a storage capacitor Cs and a test TFT (Tt). The OLED has an anode connected to a drain terminal of the driving TFT (Td) and test TFT (Tt), and a cathode connected to a VSSEL voltage. The switching TFT (Tsw) has a control terminal connected to the gate line, a source terminal connected to the data line, and a drain electrode. The driving TFT (Td) has a control terminal connected to the drain terminal of the switching TFT, a source terminal connected to the VDDEL line. The storage capacitor is connected between the source terminal of the driving TFT (Td) and the control terminal of the driving TFT (Td). The test TFT (Tt) has a control terminal connected to a test voltage line, a source terminal connected to the drain terminal of the switching TFT, and a drain terminal connected to the anode of the OLED.

The signal controller 600 receives an input image signal and an input control signal for controlling a display thereof from an outside, and generates an output image signal DAT, a gate control signal CONT 1, a data control signal CONT2, a VDDEL control signal CONT4 and the like based on the above signals. The signal controller 600 transmits the generated gate control signal CONT1 to the gate driver 400, transmits the data control signal CONT2 and the output image signal DAT to the data driver 500, and transmits the VDDEL control signal CONT4 to the VDDEL voltage driver 1200. The signal controller 600 includes a calibration unit 900 having a lookup table LUT to modify the output image signal DAT, gate control signal CONT1, data control signal CONT2, VDDEL control signal CONT4 and the like based on information stored in the lookup table LUT.

The data driver 500 receives the output image signal DAT for one pixel row according to the data control signal from the signal controller 600, converts each output image signal DAT to an analog data voltage, and then applies the converted analog data voltage to a corresponding data line. The data driver 500 includes a data current monitoring unit 700 to identify characteristics of current flowing the data lines D1, D2, D3 . . . Dn.

The gate driver 400 generates a gate-on voltage and a gate-off voltage by using the gate control signal CONT1, and applies the generated gate-on voltage and gate-off voltage to a gate line according to timing. The gate driver 400 may be an amorphous silicon gate (ASG) directly formed on the display panel 200, together with the gate line, data line, TFTs and the like. The gate driver 400 may include a gate-on voltage suppler and a gate-off voltage supplier (not shown) to apply the gate-on voltage and gate-off voltage to a gate line according to timing. The gate driver 400 includes a gate current monitoring unit 800 to identify characteristics of current flowing the gate lines (G1, G2, G3 . . . Gn).

The VDDEL voltage driver 1200 generates the VDDEL voltage applies the generated VDDEL voltages to the VDDEL lines (VD1, VD2, VD3 VDm). The VDDEL voltage driver 1200 includes an voltage regulator LDO. The VDDEL voltage driver 1200 includes a VDDEL current monitoring unit 1300 to identify characteristics of current flowing the VDDEL lines (VD1, VD2, VD3 VDm)

The calibration unit 900 receives current monitoring results CI1, CP1, CI2, CP2, CI4, and CP4 from the gate current monitoring unit 800, data current monitoring unit 700, and VDDEL current monitoring unit 1300 and stores the current monitoring results CI1, CP1, CI2, CP2, CI4, and CP4 in the lookup table LUT after conducting some processes to the current monitoring results CI1, CP1, CI2, CP2, CI4, and CP4. The current monitoring results CI1, CP1, CI2, CP2, CI4, and CP4 may include charge integration value CI1, CI2, and CI4 and current peak data CP1, CP2, and CP4. The calibration unit 900 compensates signals DAT, CONT1, CONT2, and CONT4 provided to the gate driver 400, the data driver 500, and the VDDEL (positive supply) voltage driver 1200 with referring the lookup table LUT.

The current monitoring units 700, 800, 1300 respectively include a current replication unit and a characteristic measure unit which comprises at least one of a charge integrator and a current peak detector. The current replication unit and characteristic measure unit may employ the same structure and scheme as those of the LCD.

The same characterization method used in the LCD may be applied in analyzing wire parasitics (Null driving; Comparing with null driving/first row/last row; Identifying propagation delay and build LUT). And, the LUT is used to compensate location dependency of the TFTs and OLED currents.

To characterize the driving TFT, a specific circuit is generated by applying predetermined voltages to the VDDEL and VSSEL (negative supply) terminals.

FIG. 15 is a circuit diagram of an OLED display to measure current of a driving thin film transistor (TFT). FIG. 16 is an equivalent circuit diagram of FIG. 15.

To measure current of the driving TFT, the VSSEL is raised to block the current through the OLED; the drain of the driving TFT is connected to the data line by turning on the switching TFT; and the driving TFT is configured in diode connection by turning on the test TFT. For example, as shown in FIG. 15, the VSSEL is applied with 6V; the VDDEL is applied with 3V; the gate line and test line are applied with a turn-on voltage Von. Then, the circuit of FIG. 16 is generated.

With this configuration, scanning rows is performed with applying the data lines with a set of analog voltages. Then, current pulse through the driving TFT is measured. The charge integration and peak detect methods are applied to the measured current pulse. The charge integration method gives more DC characteristic of the driving TFT.

Compensating location dependent response is executed because the measured current depends on the location in the panel since parasitic resistance and capacitance on wires affect the transient current. To compensate location dependent response, pre-characterized lookup table of wire parasitics is utilized. The affection of parasitic resistance and capacitance of the wires is subtracted from the measured transient current. The charge integration method gives better and easier calculation.

Extracted parameters of the driving TFT of each pixel are stored. Usually, current driving capability of the driving TFT splits widely in a panel for the poly-silicon TFT. After identifying the minimum or maximum value, the difference from the minimum or maximum value in each pixel TFT is calculated and stored in a lookup table. Selection between the minimum and maximum value depends on the preferred implementation.

Characterization may need once in the factory because TFT characteristic shift can be ignored in practical application. The lookup table can be stored in NVM (non volatile memory) as like as OTP, MTP, EEPROM, flash etc. Storing the difference helps reducing the size of table Compensation is performed in real driving with the lookup table of difference. When a display gray level at a specific pixel is given, the difference at the pixel location is identified in the lookup table and, since the driving TFT cannot be measured at all gray levels, the difference is scaled according to the input gray level. Then, the scaled difference at the input gray level is added or subtracted. The difference is added when the base is the minimum and is subtracted when the base is the maximum.

To characterize the OLED, also, a specific circuit is generated by applying predetermined voltages to the VDDEL and VSSEL terminals.

FIG. 17 is a circuit diagram of an OLED display to measure current of an organic light emitting diode. FIG. 18 is an equivalent circuit diagram of FIG. 17.

Measure and characterization is almost same with those of the driving TFT current except setting of the VDDEL and VSSEL.

To measure response current of the OLED, the VDDEL is lowered to block the current through the driving TFT; and the anode of the OLED is connected to the data line by turning on the test TFT. Then, the driving TFT is configured in diode connection but current is blocked.

With this configuration, scanning rows is performed with applying the data lines with a set of analog voltages. Then, current pulse through the OLED is measured. The charge integration and peak detect methods are applied to the measured current pulse. The charge integration method gives more DC characteristic of the OLED.

Compensating location dependent response is executed because the measured current depends on the location in the panel since parasitic resistance and capacitance on wires affect the transient current. To compensate location dependent response, pre-characterized lookup table of wire parasitics is utilized.

Extracted parameters of the OLED of each pixel are stored. Usually, OLED current splits widely in a panel due to aging. Aging depends on display contents and use model over the life time. After identifying the maximum value across the panel, the difference from the maximum value in each pixel OLED is calculated and stored in a lookup table. The maximum pixel can be regarded as the least aged pixel. The difference from the least aged one will be added in real driving.

Periodic characterization is needed during the lift time of the OLED display, and the lookup table should be stored in a multiple time updatable non-volatile memory (NVM), such as MTP, EEPROM, flash etc. Storing the difference helps reducing the size of table.

Compensation is performed in real driving with the lookup table of difference. Compensating real driving with the lookup table of the difference is almost same as the case of the driving TFT compensation except that adding the scaled difference is the only practical option.

Aforementioned current monitoring scheme may be applied to implement an imbedded touch sensing operation.

FIG. 19 is a schematic diagram of an LCD with imbedded touch sensing operation, according to an exemplary embodiment of the present invention. FIG. 20 is a simplified perspective view for showing common electrodes of an LCD with imbedded touch sensing operation, according to another exemplary embodiment of the present invention.

Touch sensing electrode is disposed to user's finger side. Usually, a common electrode of an LCD is on users' side. Data lines may also be placed at user's side.

As the first option, the common electrodes may be utilized as touch sensing electrodes. Referring FIG. 19, multiple common electrodes may be connected to each other make a group. The number of groups depends on the required touch resolution. Each group is sequentially connected to a special common voltage regulator LDO1 where VCOM1 is applied and current is measured by using a current monitoring unit. Rests of the groups are tied to a generic common voltage regulator LDO3 where VCOM2 is applied and current measure is not performed. At least one of the voltage regulators LDO1 and LDO3 may be replaced by an amplifier. A shift register may be used for this connection control. The groups of the common electrodes may be called as horizontal electrodes of touch, and this operation may be called as Y scan of touch. However, a single common electrode may be used as a horizontal electrode.

The counter electrodes against the common electrodes are the data lines. The data lines run vertically over the common lines. The data lines may be grouped by a data driver and the currents in a group are summed together. The groups of the data lines may be called as vertical electrodes of touch. The vertical electrodes may be scanned along with Y scan for easy multi-touch operation. Scan means applying distinguished value on each group of data lines through amplifiers in sequence to check X-axis dependency. This operation may be called as X scan of touch.

Writing current through pixel capacitor return through data lines. The response currents at the data drivers are measured along with the voltage regulator LDO1. When some charges are drawn out through a finger, the return current reduces. By comparing the return current with the expected one by referring a reference, touch of the finger can be detected. A comparator executes the comparing. A touch monitor receives compared data from the comparator and determines whether a touch is applied or not, and where the touch is applied, if any. The touch monitor and the comparator may be designed to be a part of the signal controller 600 of FIG. 1. Referring FIG. 19, two comparators (comp) are employed to respectively compare the response currents at the data drivers and at the common voltage regulator LDO1 which may be a part of a common voltage driver.

Both the common voltage regulator LDO1 and the data line amplifiers perform drive and sense functions. If sense amplifiers are added on both sides, complexity will increase and extra space will be required. By utilizing the drive and sense features, increasing complexity and requirement of extra space may be avoided.

Usually, the common electrodes are placed on both glasses in an LCD except for IPS or FFS panels. Referring FIG. 20, the common electrode on the upper glass may be separated in a plurality of stripes and connected to the common electrodes of the lower glass with inter-glass taps. The common electrodes of at least one of the upper and lower glasses may be grouped.

Touch sensing operation may be executed during the vertical blank period or the horizontal blank period. Touch sensing operation may also be executed in the display period.

At First, touch sensing operation during the vertical blank period will be described.

FIG. 21 is a signal wave form diagram of the LCD of FIG. 19 performing touch sensing operation during vertical blank period.

Referring FIG. 21, three combinations in paring the common electrode voltage (com) and data line voltage (data) may be applied during vertical blank period:
1. com toggles while data is in static.
2. com is in static while data toggles. This is a natural way to implement imbedded touch in a dot inversion panel.
3. both com and data toggle in differential way. This method provides the biggest response current among the three combinations.

There are two ways in controlling gate line:
1. gates in the group being scanned are turned on. This way increases current level because pixel capacitances are added in the current path. However, flicker may occur on display because pixel voltages are updated during this touch scan.
2. gates are turned off during entire vertical blank period. Lower current level is expected because the current through only parasitic capacitors. However, display artifact can be reduced because pixel values are not affected.

Touch sensing operation during the horizontal blank period will be described.

FIG. 22 is a signal wave form diagram of the LCD of FIG. 19 performing touch sensing operation during horizontal blank period.

Referring FIG. 22, three combinations in paring the common electrode voltage (com) and data line voltage (data) may be applied during vertical blank period:
1. com toggles while data is in static.
2. com is in static while data toggles. This is a natural way to implement imbedded touch in a dot inversion panel.
3. both com and data toggles in differential way. This method provides the biggest response current among the three combinations.

Touch sensing operation during in the display period will be described.

Display and touch sensing operations are simultaneously executed by using shared stimulus. Shared stimulus means display data itself is utilized as a stimulus for touch sensing.

Display data is driven to the panel the same as usual. Reference signal for touch sensing is also driven. Then, returning display signal is monitored and is compared with delayed input. Attenuation means a finger was touched This method does not affect on display time. However, a complicated detection process is required because display contents changes dynamically. This method needs extensive use of lookup tables LUT1 to calculate expectation with the display data. When this method is employed in an OLED display, LUT2 and LUT3 also need to be used. This method needs conversion process. Either response is converted to digital data or expectation is converted to digital data.

Two operations are performed while display data drives data lines. The transient current at the data driver is measured. And, the expectation of the response is calculated by utilizing LUT1 (LUT2 and LUT3 in OLED display).

Touch is sensed by comparing the measured response with the expectation. The measured response will be smaller than the expectation when a finger took return charges.

Full sequence of touch sensing is as follows:
1. characterize passive matrix to build LUT1
2. characterize active matrix to build LUT2 and LUT3 in OLED display
3. drive display with calibration by using those LUT's
4. measure response and calculate expectation
5. compare response and expectation to find external interference modulated the current return path When the imbedded touch sensing operation is employed in an OLED display, gate lines may be utilized as the horizontal electrodes of touch instead of the common electrodes in LCD.

FIG. 23 is a schematic diagram of an OLED display with imbedded touch sensing operation, according to an exemplary embodiment of the present invention.

FIG. 23 is almost same as FIG. 19 except that VCOM1 and VCOM2 are replaced with VGH and VGL. That is, gate lines are utilized as the horizontal electrodes of touch.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A display device comprising:
   a display panel including a plurality of data lines, a plurality of gate lines, a plurality of common electrode lines, and a plurality of pixels;
   a data driver configured to output data signals to the data lines and comprising a first current monitoring unit configured to monitor output current of the data driver;
   a gate driver configured to output gate signals to the gate lines;
   a common voltage driver to output common voltages to the common electrode lines and comprising a second current monitoring unit configured to monitor output current of the common voltage driver;
   a signal controller configured to control the data driver, the gate driver, and the common voltage driver and comprising;
   a touch monitor determining whether a touch is applied or not, and where the touch is applied, if any, by using current monitoring results of the first current monitoring unit and the second current monitoring unit; and
   wherein the common electrode lines includes first common electrode lines and second common electrode lines, and
   the display panel further comprises:
   a first substrate having the first common electrode lines and a second substrate having the second common electrode lines; and
   a plurality of taps connecting the first common electrode lines and the second common electrode lines.

2. The display device of claim 1, further comprising:
   a first comparator comparing the current monitoring results of the first current monitoring unit with first expected values and providing a first comparison data to the touch monitor; and
   a second comparator comparing the current monitoring results of the second current monitoring unit with second expected values and providing a second comparison data to the touch monitor.

3. The display device of claim 1, wherein the data driver and the common voltage driver respectively apply a first stimulating voltage to the data line and a second stimulating voltage to the common electrode line during a vertical blank period.

4. The display device of claim 1, wherein the data driver and the common voltage driver respectively apply a first stimulating voltage to the data line and a second stimulating voltage to the common electrode line during a horizontal blank period.

5. The display device of claim 1, wherein the touch monitor executes a touch sensing operation during a display period by using display data as stimulating signals.

6. The display device of claim 1, wherein at least one of the first common electrode lines and the second common electrode lines are divided in a plurality of groups and common electrode lines in a group are connected to each other.

7. The display device of claim 1, wherein the data lines are divided in a plurality of groups and data lines in a group are simultaneously applied with a stimulating voltage.

8. A display device comprising:
   a display panel including a plurality of data lines, a plurality of gate lines, a plurality of common electrode lines, and a plurality of pixels;
   a data driver configured to output data signals to the data lines and comprising a first current monitoring unit configured to monitor output current of the data driver;
   a gate driver configured to output gate signals to the gate lines and comprising a second current monitoring unit configured to monitor output current of the gate driver;
   a signal controller configured to control the data driver, the gate driver, and a common voltage driver with the plurality of common electrode lines and comprising;
   a touch monitor determining whether a touch is applied or not, and where the touch is applied, if any, by using current monitoring results of the first current monitoring unit and the second current monitoring unit; and
   wherein the common electrode lines includes first common electrode lines and second common electrode lines, and
   the display panel further comprises:
   a first substrate having the first common electrode lines and a second substrate having the second common electrode lines; and
   a plurality of taps connecting the first common electrode lines and the second common electrode lines.

9. The display device of claim 8, further comprising:
   a first comparator comparing the current monitoring results of the first current monitoring unit with first expected values and providing a first comparison data to the touch monitor; and
   a second comparator comparing the current monitoring results of the second current monitoring unit with second expected values and providing a second comparison data to the touch monitor.

10. The display device of claim 8, wherein the data driver and the gate driver respectively apply a first stimulating voltage to the data line and a second stimulating voltage to the gate line during a vertical blank period.

11. The display device of claim 8, wherein the data driver and the gate driver respectively apply a first stimulating voltage to the data line and a second stimulating voltage to the gate line during a horizontal blank period.

12. The display device of claim 8, wherein the touch monitor executes a touch sensing operation during a display period by using display data as stimulating signals.

13. The display device of claim 8, wherein each of the pixels comprises:
- an organic light emitting diode having a cathode connected to a negative supply voltage and an anode;
- a switching thin film transistor having a control terminal connected to the gate line, a source terminal connected to the data line, and a drain electrode;
- a driving thin film transistor a control terminal connected to the drain terminal of the switching TFT, a source terminal connected to a positive supply voltage line, and a drain terminal connected to the anode of the organic light emitting diode; and
- a storage capacitor connected between the control terminal and the drain terminal of the driving thin film transistor; and
- a test thin film transistor having a control terminal connected to a test voltage line, a source terminal connected to the drain terminal of the switching TFT, and a drain terminal connected to the anode of the OLED.

14. The display device of claim 8, wherein the gate lines are divided into a plurality of groups and gate lines in a group are simultaneously applied with a stimulating voltage.

15. The display device of claim 8, wherein the data lines are divided in a plurality of groups and data lines in a group are simultaneously applied with a stimulating voltage.

* * * * *